United States Patent
Kaur et al.

(10) Patent No.: US 10,540,225 B2
(45) Date of Patent: Jan. 21, 2020

(54) DATA VALIDATION

(71) Applicant: Hewlett Packard Enterprise Development LP, Houston, TX (US)

(72) Inventors: Satwant Kaur, San Jose, CA (US); Babak Makkinejad, Troy, MI (US); Parag Doshi, Marietta, GA (US); Corey Wick, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 190 days.

(21) Appl. No.: 15/574,578

(22) PCT Filed: May 27, 2015

(86) PCT No.: PCT/US2015/032570
§ 371 (c)(1),
(2) Date: Nov. 16, 2017

(87) PCT Pub. No.: WO2016/190856
PCT Pub. Date: Dec. 1, 2016

(65) Prior Publication Data
US 2018/0157552 A1    Jun. 7, 2018

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0709* (2013.01); *G06F 11/0736* (2013.01);
(Continued)

(58) Field of Classification Search
CPC ............. G06F 11/0736; G06F 11/0784; G06F 11/079; G06F 11/263; G06F 11/3051; G06F 11/3055; G06F 11/3452; G06F 11/3409
See application file for complete search history.

(56) References Cited

U.S. PATENT DOCUMENTS 5,515,268 A    5/1996    Yoda
5,655,081 A *  8/1997    Bonnell ............. G06F 11/0748
                                                        709/202
(Continued)

FOREIGN PATENT DOCUMENTS

WO    WO-2004111484    12/2004

OTHER PUBLICATIONS

Kreamer "Sensor Fault Identification Using Autoregressive Models and the Mutual Information Concept", Sep. 15, 2007, University of Siegen, vol. 347, pp. 387-392 (Year: 2007).*
(Continued)

*Primary Examiner* — Bryce P Bonzo
*Assistant Examiner* — Jeison C Arcos
(74) *Attorney, Agent, or Firm* — Hewlett Packard Enterprise Patent Department

(57) ABSTRACT

Examples associated with data validation are disclosed. One example includes a sensor attribute data store having information describing attributes of a set of distributed sensors. A pattern data store stores information describing patterns indicating anomalous sensor activity. A data aggregation module flags data received from a tested sensor as anomalous data when the anomalous data exceeds a variance level described by an attribute of the tested sensor. A data validation module validates the anomalous data by comparing the anomalous data to the patterns indicating anomalous sensor activity. A learning module updates the pattern indi-
(Continued)

cating anomalous sensor activity based on a result received from the validation logic after the validation logic validates data received from the tested sensor.

13 Claims, 8 Drawing Sheets

(51) Int. Cl.
    *G06N 20/00*          (2019.01)
    *G06F 16/23*          (2019.01)
    *H04L 29/08*          (2006.01)

(52) U.S. Cl.
    CPC ......... *G06F 16/2365* (2019.01); *G06N 20/00* (2019.01); *H04L 67/12* (2013.01)

(56) References Cited

U.S. PATENT DOCUMENTS

| | | | |
|---|---|---|---|
| 6,282,701 B1* | 8/2001 | Wygodny | G06F 11/3466 702/183 |
| 6,499,114 B1* | 12/2002 | Almstead | G05B 19/4184 714/25 |
| 7,230,528 B2 | 6/2007 | Kates | |
| 7,603,222 B2* | 10/2009 | Wiseman | F01D 17/24 701/100 |
| 7,677,079 B2 | 3/2010 | Radziszewski et al. | |
| 8,341,106 B1 | 12/2012 | Scolnicov et al. | |
| 8,749,380 B2 | 6/2014 | Vock et al. | |
| 9,661,018 B1* | 5/2017 | Aziz | H04L 63/1425 |
| 2002/0194304 A1* | 12/2002 | Cramer | H04L 29/06 709/218 |
| 2003/0065986 A1* | 4/2003 | Fraenkel | G06F 11/3006 714/47.2 |
| 2003/0079160 A1* | 4/2003 | McGee | G06F 11/0709 714/39 |
| 2003/0110007 A1* | 6/2003 | McGee | G06F 11/0709 702/179 |
| 2003/0204350 A1* | 10/2003 | Rearick | G01R 31/318328 702/117 |
| 2003/0204683 A1* | 10/2003 | Okumoto | G06F 3/061 711/147 |
| 2004/0225381 A1* | 11/2004 | Ritz | G06F 11/0709 700/26 |
| 2004/0236820 A1* | 11/2004 | Flocken | G06F 11/0709 709/200 |
| 2007/0163324 A1 | 7/2007 | McMahan et al. | |
| 2008/0040174 A1* | 2/2008 | Murthy | G06Q 30/06 709/224 |
| 2011/0119219 A1* | 5/2011 | Naifeh | H04L 41/0604 706/47 |
| 2012/0102002 A1 | 4/2012 | Sathyanarayana et al. | |
| 2012/0166623 A1* | 6/2012 | Suit | G06F 11/3006 709/224 |
| 2012/0167094 A1* | 6/2012 | Suit | G06F 9/5077 718/100 |
| 2012/0197852 A1* | 8/2012 | Dutta | H04L 67/2804 707/692 |
| 2012/0215450 A1 | 8/2012 | Ashok et al. | |
| 2012/0311260 A1* | 12/2012 | Yamagiwa | H04L 41/085 711/117 |
| 2013/0227714 A1* | 8/2013 | Gula | G06F 21/64 726/32 |
| 2014/0025417 A1* | 1/2014 | Appel | G06Q 10/063114 705/7.15 |
| 2014/0222813 A1 | 8/2014 | Yang et al. | |
| 2014/0257828 A1* | 9/2014 | Thornley | G06F 11/00 705/2 |
| 2014/0266790 A1* | 9/2014 | Al-Ali | G08C 17/02 340/870.09 |
| 2015/0026413 A1* | 1/2015 | Meier | G06F 12/0862 711/137 |
| 2015/0163121 A1* | 6/2015 | Mahaffey | G06F 11/0766 707/687 |
| 2015/0192439 A1* | 7/2015 | Mihelich | G01D 18/00 702/104 |
| 2015/0381646 A1* | 12/2015 | Lin | H04L 63/1416 726/23 |
| 2016/0103838 A1* | 4/2016 | Sainani | G06F 3/0488 707/725 |
| 2016/0203036 A1* | 7/2016 | Mezic | G06F 11/079 714/819 |
| 2016/0239433 A1* | 8/2016 | Frachtenberg | G06F 12/121 |
| 2017/0003984 A1* | 1/2017 | Gatson | G06F 9/44505 |
| 2017/0004421 A1* | 1/2017 | Gatson | G06Q 10/06 |
| 2017/0235622 A1* | 8/2017 | Boyapalle | G06F 11/3055 714/47.2 |
| 2017/0315917 A1* | 11/2017 | Yamamoto | G06F 12/0862 |
| 2017/0357525 A1* | 12/2017 | Gatson | G06F 9/44505 |

OTHER PUBLICATIONS

Goebel "Correcting Sensor Drift and Intermittency Faults With Data Fusion and Automated Learning", Jun. 2008, IEEE, vol. 2, No. 2, pp. 189-197 (Year: 2008).*

Hill, "Anomaly detection in streaming environmental sensor data: A data-driven modeling approach" Oct. 24, 2009, ScienceDirect, pp. 1015-1022 (Year: 2009).*

Haque et al ~ "Sensor Anomaly Detection in Wireless Sensor Networks for Healthcare" ~ Sensors 2015 ~ pp. 8764-8786.

International Serching Authority, The International Search Report and the Written Opinion, dated Mar. 31, 2016, PCT/US2015/032570, 10 Pgs.

Javed et al ~ "Automated Sensor Verification Using Outlier Detection in the Internet of Things" ~ http://www.ecs.umass.edu ~ Apr. 2012 ~ 6 pages.

Neto et al ~ "Sensing in the Collaborative Internet of Things" ~ Sensors 2015 ~ 26 Pgs.

* cited by examiner

DATA VALIDATION

BACKGROUND

As more and more devices are embedded with electronics and networked applications, these devices are being connected to the internet, creating what is becoming known as the "internet of things". Manufacturers, data aggregators, other devices, and so forth receive data from the devices describing their use, environment, and so forth. Applications range from environmental monitoring (e.g., disaster early warning systems), to health care (e.g., remote patient monitoring), and even automating and/or remotely controlling home appliances (e.g., air conditioning). When the devices transmit data, the data itself may valuable, especially when aggregated with data from other devices including other distributed devices of the same type, other local devices, and so forth.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
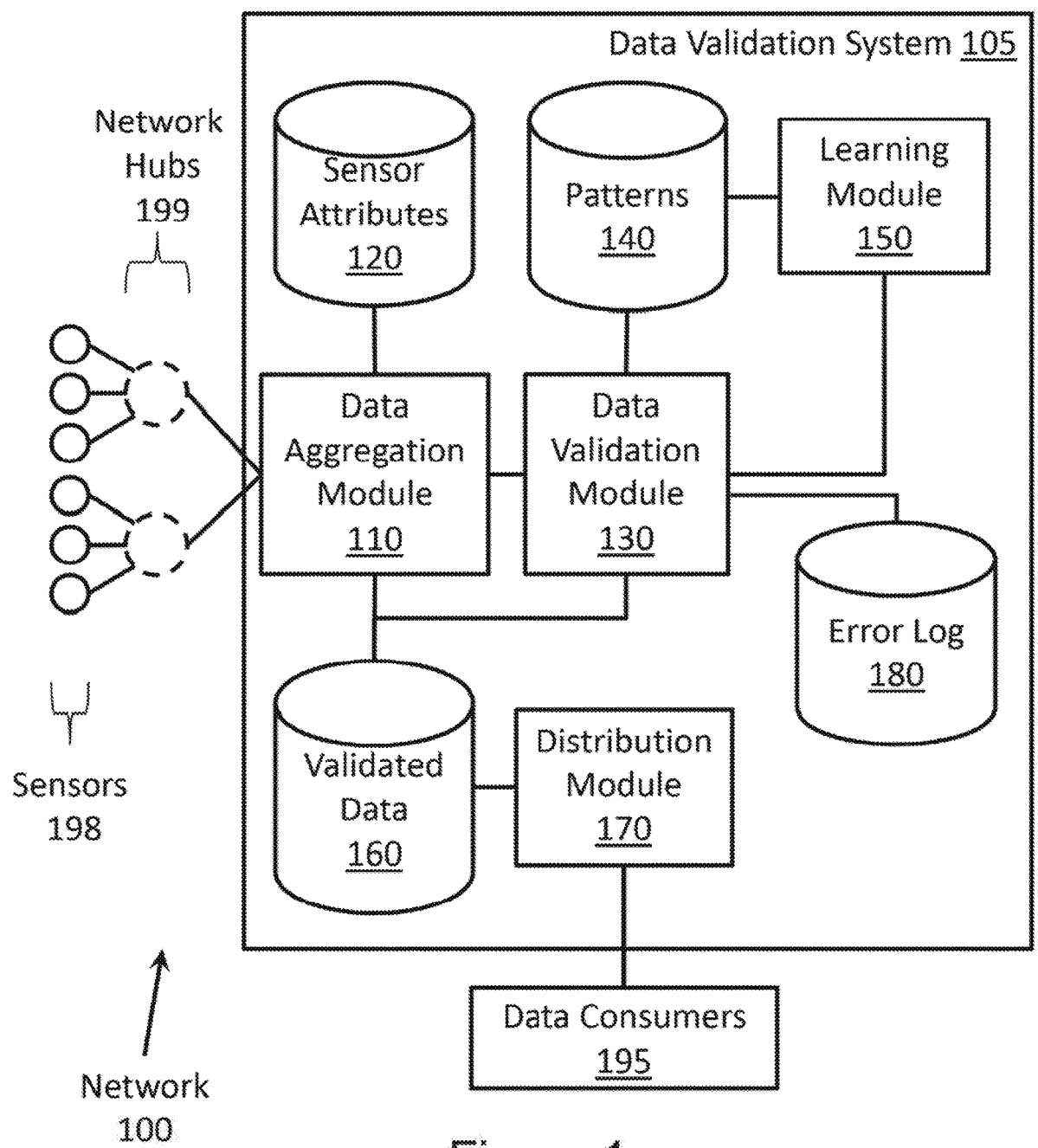
FIG. 1 illustrates an example network in which example systems, methods, and equivalents, may operate.

Systems, methods, and equivalents associated with data validation are described. As mentioned above many devices that are connected to the internet transmit data regarding device status, environmental states, and so forth. This data is collected by various sensors in the devices and transmitted to, e.g., an operator of the device, a manufacturer of the device, and so forth. In some cases, after data is collected, valuable information may be derived from the data. However, over time, devices may begin to malfunction due to wear and tear. Other factors (e.g., network error) may also contribute to situations where a device transmits data that is incorrect. Consequently, it may be valuable to distinguish when anomalous data received from a sensor is a result of a sensor malfunction, or from an actual event of significance that the sensor was designed to monitor.

By way of illustration, an earthquake early warning system may be made up of many distributed sensors. If first sensor malfunctions and begins "detecting" seismic activity, the fact that other sensors are not detecting the seismic activity may indicate the first sensor is malfunctioning. On the other hand, if many sensors are detecting seismic activity, it is much more likely an event of significance has occurred, as it is unlikely for many of the sensors to be malfunctioning simultaneously. In another example, if a sensor measuring temperature in a server room, suddenly jumps a very high temperature reading, but then returns to a prior value, it is likely the high temperature reading was an anomaly resulting from a malfunction. If the high temperature is preceded by a steady increase in temperature of the server room, it is likely the sensor is functioning properly and an event of significance has occurred.

Consequently, when data received from a sensor, first the data may be checked to see if it falls within typical behavior patterns for that sensor as defined by, for example, specifications associated with that sensor based on sensor type, manufacturer, and so forth. If the data falls outside the typical behavior patterns, the data may be categorized as anomalous and flagged for further analysis. Anomalous data may then be verified by comparing the data to a set of patterns associated with anomalous data that facilitate identifying whether the data is a result of a malfunction or whether the data is a legitimate reading from the sensor. In some cases, the patterns may be updated as data is classified, and anomalous data may be logged, so that the anomalous data can be re-verified at a later time.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include one or more gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

FIG. 1 illustrates an example network 100 in which example systems and methods, and equivalents, may operate. It should be appreciated that the items depicted in FIG. 1 are illustrative examples and many different features and implementations are possible.

FIG. 1 illustrates an example network 100. Network 100 includes a numerous sensors 198. In some examples the sensors may feed data into network hubs 199 who serve as owners or administrators of different networks of sensors 198. In these examples, network hubs 199 may provide aggregated and/or disaggregated data to a data validation system 105. In other examples sensors 198 may directly connect to data validation system 105, causing sensor data to be provided directly to data validation system 105 without an network hub 199 affecting the data.

Whether the sensor data is received directly from sensors 198 or from network hubs 199, the sensor data may be initially processed by data aggregation module 110. Data aggregation module 110 may process the sensor data based on sensor attributes 120. Sensor attributes 120 may include, for example, make, model, and specifications of sensors from which sensor data is retrieved. Sensor attributes 120 may also include, for example, known data variations, malfunctions, and causes. In various examples, sensor attributes 120 may state variance levels and/or variance levels may be derived from sensor attributes 120 to facilitate detecting when sensors are behaving according to expectations or producing anomalous data.

By way of illustration, a sensor that measures air temperature in a home may typically read between 65 and 85 degrees Fahrenheit depending on the time of year and climate control usage (e.g., heat, air conditioning), among other factors. Various companies may be interested in this data. For example, an energy company may use the data to facilitate planning energy production, a company that sells energy efficiency products may use the data for targeting advertisements to an owner of the home, and so forth. For the sensor, a reading above 100 degrees may be considered to be outside normal operation of the sensor. This may be because the reading over 100 degrees may exceed a variance level associated with that sensor as defined by or derived from sensor attributes 120. When the reading exceeds the variance level, that data may be flagged as anomalous by the data aggregation module 110. Data that falls within the variance level may be considered validated data 160 that is treated as accurate which may subsequently be provided to data consumers (e.g., the energy company, the energy efficiency company) 195 via distribution module 170.

Data flagged as anomalous, however, may not necessary be related to a malfunction of, for example, the sensor, the network, and so forth. By way of illustration, the reading above 100 degrees could also be a result of a significant event such as, for example, a heat wave and a broken air conditioning system, a house fire, or another legitimate reason. Events of significance, though outside normal operation of the sensor, if they can be properly identified may be useful for triggering certain events (e.g., repair the broken air conditioner, call the fire department) in response to the significant events.

Consequently, when data is flagged as anomalous, a data validation module 130 may perform further processing on the anomalous data. In some examples, the data may be compared to various patterns 140. The patterns may include, for example, predefined patterns input by a user or administrator, patterns learned from analyzing data received from sensors 198 over time, and so forth. A pattern 140 may take more information into account when validating anomalous data than data aggregation module does at 110. For example, patterns 140 may account for past data of the sensor, data of nearby sensors, and other factors that may indicate whether data flagged as anomalous is a result of a sensor malfunction or an event of significance.

As used herein a sensor malfunction is intended to encompass any technological error, glitch, or otherwise that may contribute to a sensor providing data considered anomalous. These may include issues arising directly from the sensor, issues arising from transmitting and/or storing data received from the sensor, and so forth. An event of significance is intended to encompass any real event that produces real data that is accurate, even though the data may be considered anomalous as a result of being outside the normal behavior pattern of the sensor (e.g., several standard deviations from normal operation). Though sensors may be configured to track, monitor, and so forth, important events while operating normally, here, events of significance is a term intended to encompass actual events outside of expected behaviors of the sensor.

The patterns may be associated with weights that indicate a level of confidence of whether data matching the pattern is a result of a malfunction or a significant event. Consequently, the more and/or more strongly weighted patterns that a piece of anomalous data matches that indicate the data is a result of a significant event, the more confident data validation module 130 may be that that data should be included with validated data 160. Similarly, the more and/or more strongly weighted patterns that a piece of anomalous data matches that indicate the data is a result of an malfunction, the more confident data validation module 130 may be that the data should not be included with validated data 160.

By way of illustration, when the home temperature sensor detects the 100 degree temperature and that measurement is flagged by data aggregation module 110 as anomalous, data validation module 130 may compare that measurement to patterns 140. One pattern, for example, may compare the 100 degree measurement to measurements of other temperature sensors in the home. If many temperature sensors have similar readings, it may be more likely that the 100 degree measurement is valid. On the other hand, if the measurement when compared to other preceding and subsequent measurements of the home temperature sensor, is an outlier, data validation module 130 may be more confident that the reading was a one-time malfunction. In some examples, data validation module 130 may not be tasked with actually identifying what type of malfunction or significant event has occurred. Diagnosing malfunctions and/or significant events may be performed by other modules (not shown), data consumers, and so forth. Patterns of sensor behavior involving other types of sensors, external data, data histories, and so forth may also be taken into consideration by data validation module 130.

When data validation module makes a decision regarding whether data is a result of an event of significance or a result of a malfunction, data validation module 130 may communicate this decision to a learning module 150. Learning module 150 may use the decision to update the patterns 140. Updating patterns 140 may include modifying patterns 140, creating patterns 140, removing patterns 140, and so forth. Modifying patterns 140 may also include updating weights associated with patterns 140 to increase or decrease confidence as to whether data matching patterns 140 is a result of an anomaly or an event of significance. Consequently, over time, the learning module 150 may increase reliability of data validation module 130 by increasing the likelihood that anomalous data is appropriately categorized.

Data validation system 105 also includes an error log 180. In some examples, error log 180 may store data marked as anomalous in addition to notations as to whether that data was validated as an event of significance or found to be a result of a malfunction. Logging anomalous data may facilitate periodically revalidating the anomalous data by, for example, data validation module 130. Revalidating anomalous data may be occasionally appropriate due to the updates to patterns 140 by learning module 150. In various examples, revalidating data may cause some data that was previously rejected as a malfunction to be subsequently added to validated data 160 and/or for data that was previously validated to be removed from the validated data 160. Error log 180 may also include for a given piece of anomalous data, for example, notations related to a pattern which was found to be strongly determinative as to whether the piece of anomalous data was considered a result of an event of significance or a malfunction, notations indicating a decision strength regarding whether the piece of anomalous data was considered a result of an event of significance or a malfunction (e.g., close to 50%, close to 100% or 0%), and so forth.

As mentioned above data validation system 105 also includes a distribution module 170. Distribution module 170 may facilitate distribution of validated data 160 to data consumers 195. How distribution module 170 operates may depend on who data consumers 195 are, their relationship to an operator of data validation system 105, privacy and/or security concerns, and so forth. For example, a lower security solution may be to provide raw validated data 160 to data consumers 195. In other examples, distribution module 170 may operate as an interface (e.g., a structured query language interpreter) to provide control over what queries can be executed on validated data 160. Distribution module 170 could also be designed to obtain specific results from the validated data 160 and provide these results to data consumers 195 without granting access to the underlying validated data 160. Other modes of operation of distribution module 170 may also be possible.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
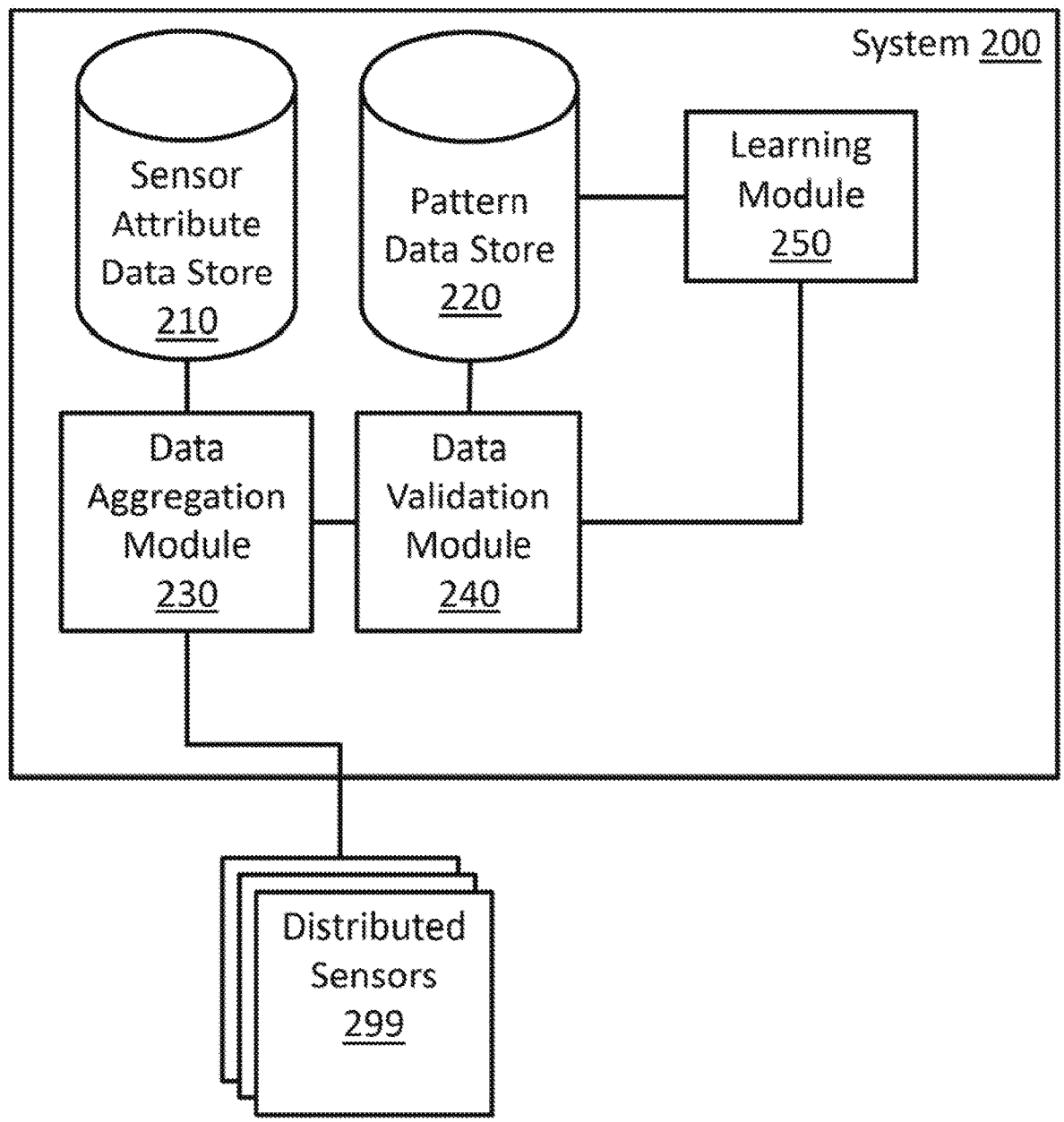
FIG. 2 illustrates an example system associated with data validation.

FIG. 2 illustrates an example system 200 associated with data validation. System 200 includes a sensor attribute data store 210. Sensor attribute data store may store information describing attributes of a set of distributed sensors 299. Attributes of the distributed sensors may include, for example, attributes describing model information of the sensors (e.g., manufacturer, standards the sensor adheres to), attributes describing expected data to be received from the sensors (e.g., ranges), attributes describing expected anomalous behaviors of the sensors, and so forth (e.g., errors the sensor may raise, known sensor bugs).

System 200 also includes a pattern data store 220. Pattern data store 220 may store information describing patterns indicating anomalous sensor activity. Patterns indicating anomalous sensor activity may include, for example, specific (e.g., pre-defined) scenarios that describe a sensor behavior to be treated as anomalous, learned patterns of sensor behaviors to be treated as anomalous, and so forth. Patterns may facilitate comparing sensor data to sensor data from other types of sensors, other nearby sensors, historical and/or future data, and so forth. In some examples, pattern data store 220 may also include patterns that indicate non-anomalous sensor activity. These patterns of non-anomalous activity may also be, for example, pre-defined scenarios, learned scenarios, and so forth. In various examples, patterns may be associated with weights. Consequently, when a sensor behavior matches a pattern, the weight may indicate a confidence level of whether the sensor behavior is a result of, for example, a sensor malfunction, an event of significance, and so forth.

System 200 also includes a data aggregation module 230. Data aggregation module 230 may flag data received from a tested sensor as anomalous data. The tested sensor may be a member of the set of distributed sensors 299. Data may be flagged as anomalous data by data aggregation module 230 when the anomalous data exceeds a variance level described by an attribute of the tested sensor (e.g., from sensor attribute data store 210). The variance level may be an actual attribute stored in sensor attribute data store 210, derived from an attribute in sensor attribute data store 210, and so forth.

System 200 also includes a data validation module 240. Data validation module 240 may validate the anomalous data by comparing the anomalous data to the patterns indicating anomalous sensor activity (e.g., in pattern data store 220. In some examples, validation module 240 may validate the data received from the tested sensor by comparing the data received from the tested sensor to data received from sensors located within a specified physical proximity to the tested sensor. The specified physical proximity may be defined by a pattern, and may depend on sensor attributes (e.g., what the sensor was designed to measure, sensor location), and so forth.

System 200 also includes a learning module 250. Learning module 250 may update a pattern indicating anomalous sensor activity in pattern data store 220 based on a result received from validation module 240. The signal may be received when validation module 240 validates data received from the tested sensor. In various examples, learning module 250 may update the pattern by modifying a weight associated with the pattern. As described above, the weight may indicate a likelihood that anomalous data satisfying the pattern is a result of a sensor malfunction, an event of significance, and so forth.

Figure 3:
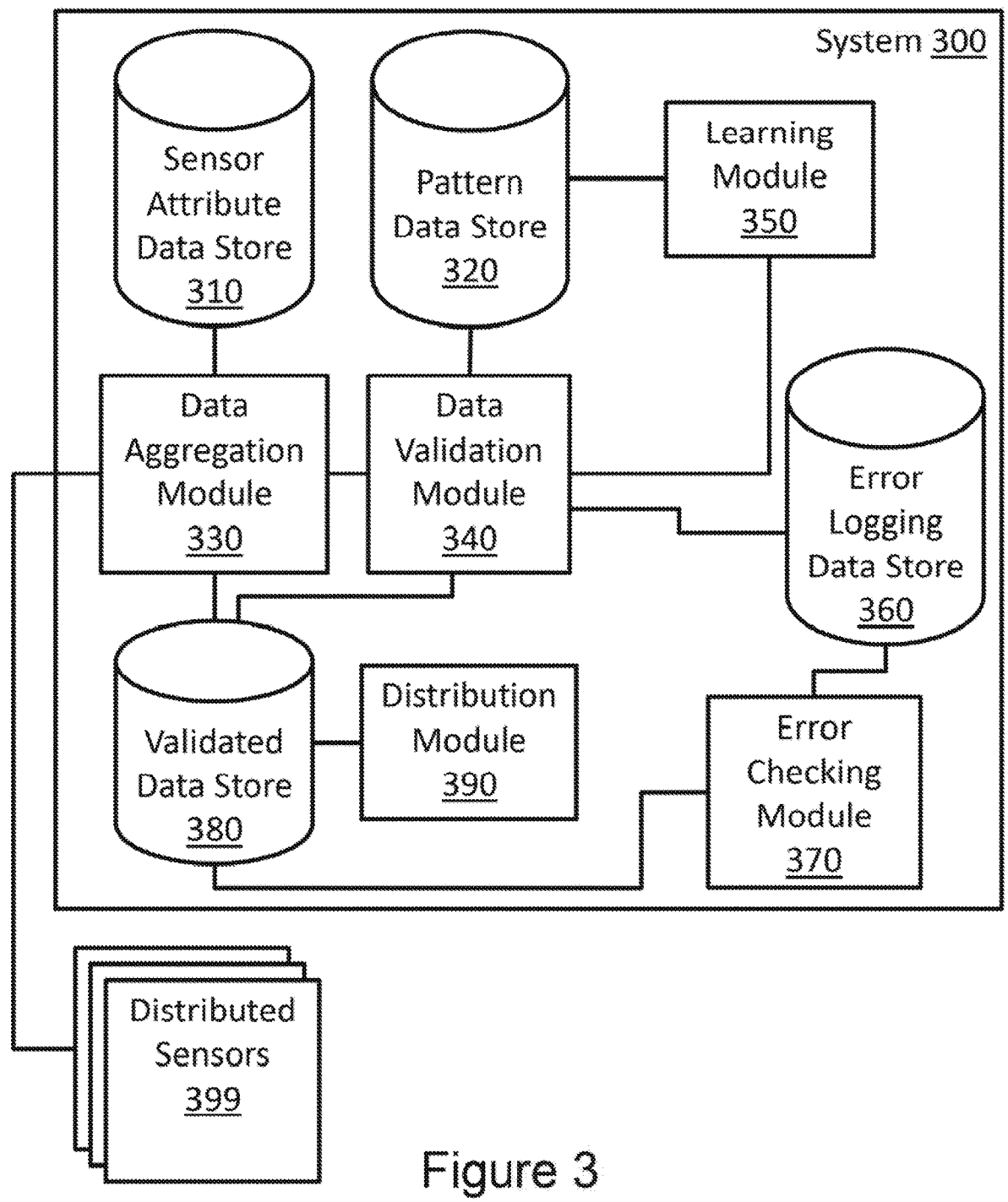
FIG. 3 illustrates another example system associated with data validation.

FIG. 3 illustrates another example system 300 associated with data validation. System 300 includes many items similar to those described above with reference to system 200 (FIG. 2). For example, system 300 includes a sensor attribute data store 310, a pattern data store 320, a data aggregation module 330 to flag anomalous data received from distributed sensors 399, a data validation module 340, and a learning module 350. System 300 also includes an error logging data store 360. Error logging data store 360 may store anomalous data that fails validation.

System 300 also includes an error checking module 370. Error checking module 370 may revalidate data in error logging data store 360 when learning module 350 updates a pattern indicating anomalous sensor activity in pattern data store 320. Though system 300 illustrates error checking module 370 as a separate component from data validation module 340, in some examples, data validation module 340 may also serve as error checking module 370.

System 300 also includes a validated data store 380. Validated data store 380 may store data received from the tested sensor that falls within the variance level. Validated data store 380 may also store anomalous data received from the tested sensor that passes validation from data validation module 340.

System 300 also includes a distribution module 390 Distribution module 390 may facilitate distribution of data in validated data store 380. Distribution module 390 may distribute data from validated data store 380 by providing raw data associated with a portion of the verified data, providing query access to the verified data, providing a result of a query of the verified data, and so forth.

Figure 4:
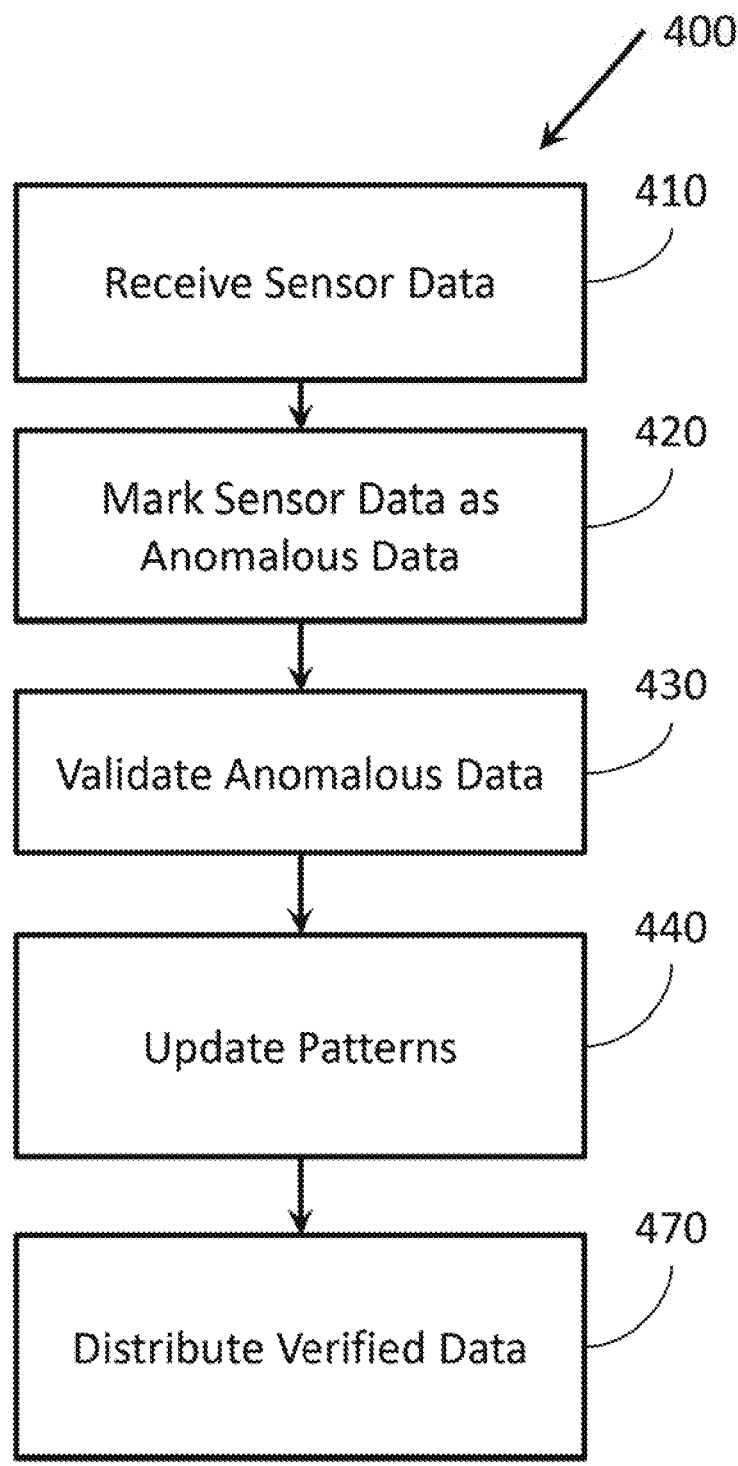
FIG. 4 illustrates a flowchart of example operations associated with validation.

FIG. 4 illustrates an example Method 400 associated with data validation. Method 400 may be embodied on a non-transitory computer-readable medium storing computer-executable instructions. The instructions, when executed by a computer, may cause the computer to perform method 400. In other examples, method 400 may exist within logic gates and/or RAM of an application specific integrated circuit (ASIC).

Method 400 includes receiving sensor data at 410. The sensor data may be received from a set of distributed sensors. Method 400 also includes marking sensor data as anomalous data at 420. The sensor data marked as anomalous data may be so marked when the anomalous data exceeds a variance level associated with a sensor from which the anomalous data was received. The variance levels for sensors may be generated based on device specifications of the sensors. The device specifications may describe, for example, known sensor malfunction scenarios for respective sensors. Consequently, the variance levels may be derived from the known sensor malfunction scenarios, and so forth.

Method 400 also includes validating the anomalous data at 430. The anomalous data may be validated based on a set of patterns describing anomalous sensor activity. Validating the anomalous data at 430 may indicate whether the anomalous data is a result of a sensor malfunction, an event of significance, and so forth.

Method 400 also includes updating the set of patterns at 440. The patterns may be updated based on whether the anomalous data is validated as the sensor malfunction and the event of significance. As described above, the set of patterns may include weights that indicate a likelihood that anomalous data is a result of a sensor malfunction. In this example, updating a pattern may include modifying a weight associated with the pattern to increase or decrease confidence in whether a sensor is malfunctioning when that sensor's behavior matches the pattern.

Method 400 also includes distributing verified data at 470. The verified data may include sensor data within the variance level and validated anomalous data. In various examples, the verified data may be distributed by providing raw data associated with a portion of the verified data, providing query access to the verified data, providing a result of a query of the verified data, and so forth. The technique used for distributing the verified data may depend on, for example, data security concerns, privacy concerns, processing availability, and so forth, and different distribution techniques may be appropriate depending on who the is receiving the distributed data.

Figure 5:
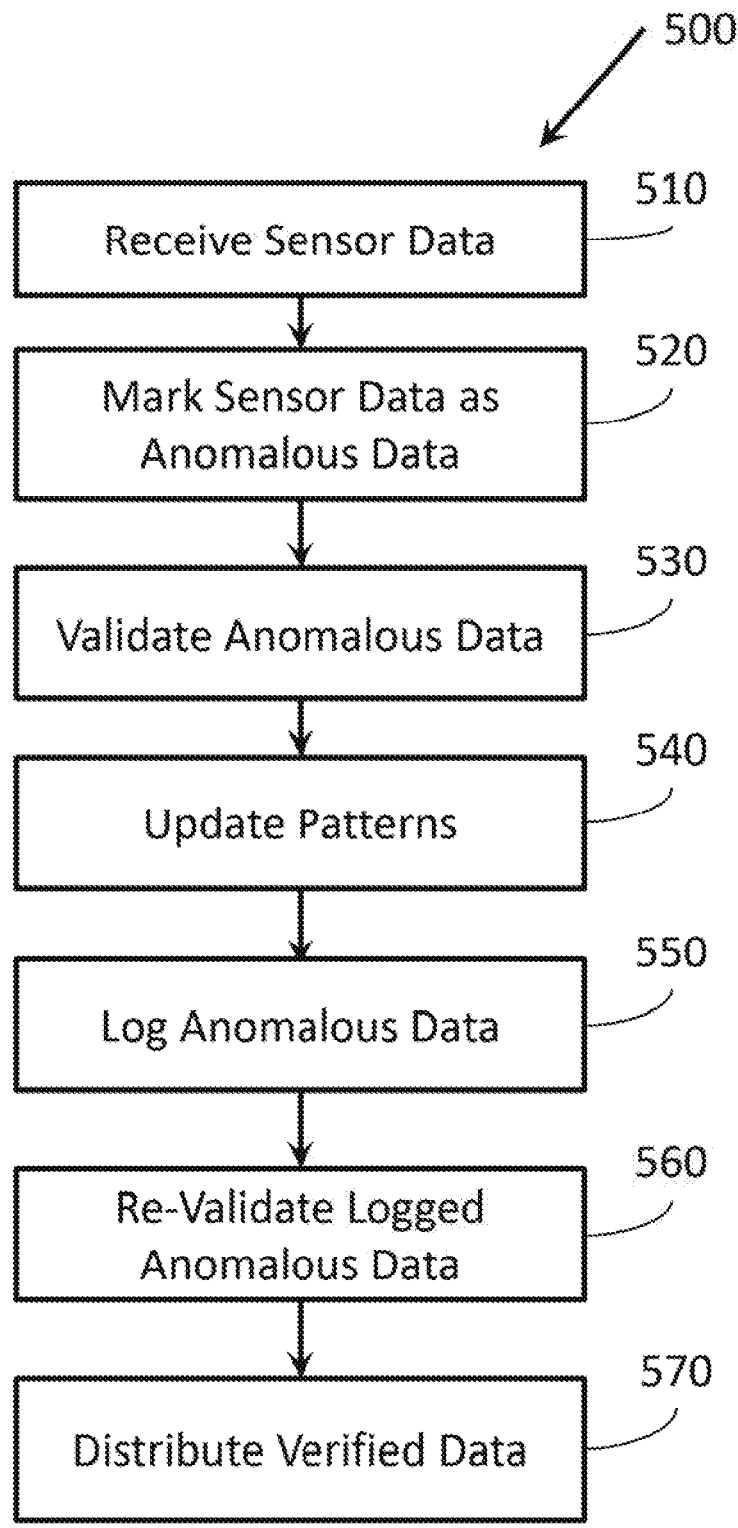
FIG. 5 illustrates another flowchart of example operations associated with data validation.

FIG. 5 illustrates another example method associated with data validation. Method 500 includes several actions similar to those described above with reference to method 400 (FIG. 4). For example method 500 includes receiving sensor data at 510, marking sensor data as anomalous data at 520, validating anomalous sensor data at 530, updating patterns at 540, and distributing verified data at 570.

Method 500 also includes logging anomalous data indicated as a sensor malfunction at 550. Method 500 also includes revalidating logged anomalous data at 560. The revalidation may occur, for example, after an update to the set of patterns. Revalidating anomalous data indicated as a sensor malfunction may facilitate making accurate data available when distributing the verified data at 570.

Figure 6:
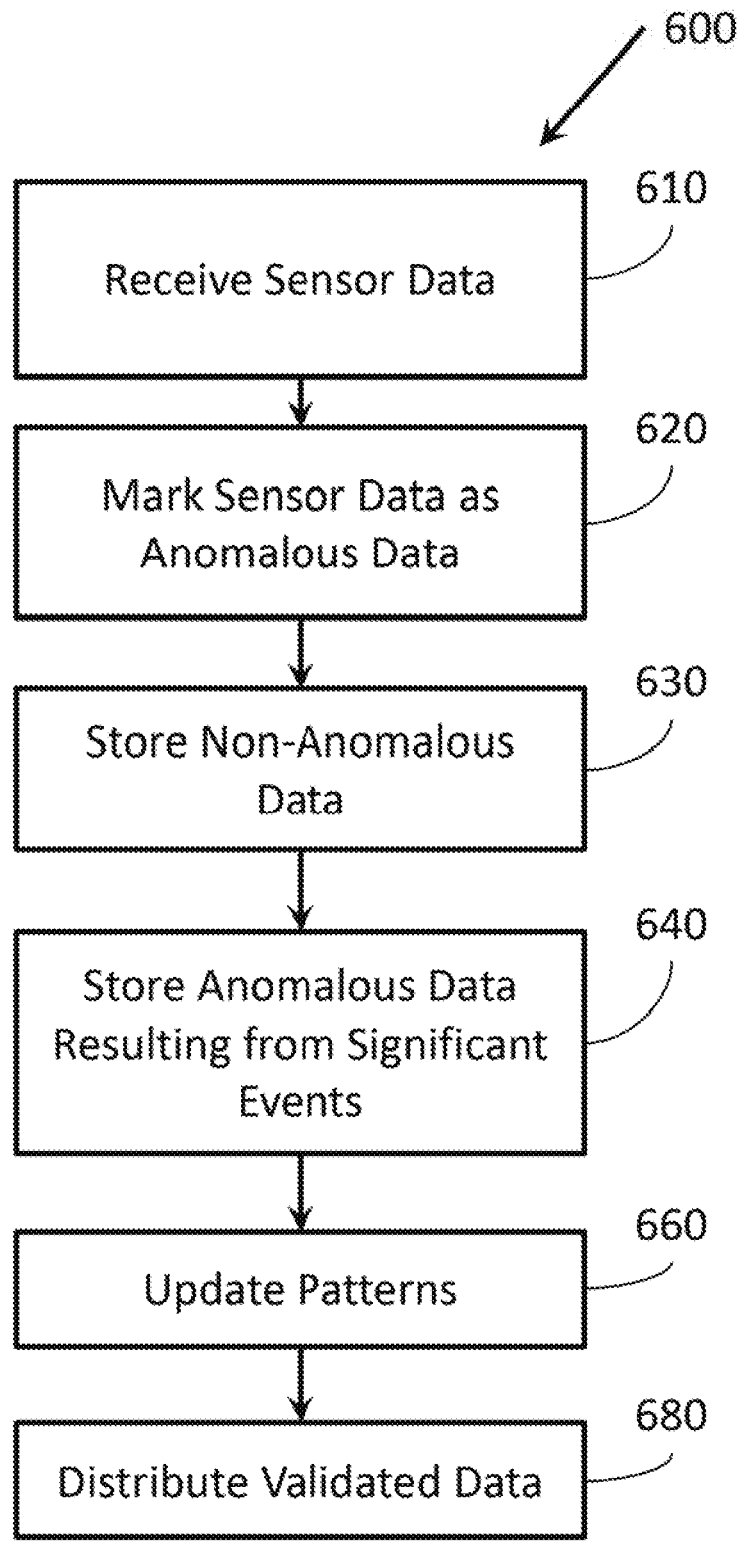
FIG. 6 illustrates another flowchart of example operations associated with data validation.

FIG. 6 illustrates a method 600 associated with data validation. Method 600 includes receiving sensor data at 610. The sensor data may be received from a set of distributed sensors.

Method 600 also includes marking sensor data as anomalous data at 620. Sensor data may be marked as anomalous data when the anomalous data exceeds a variance level associated with a sensor from the anomalous data was received. The variance level for a sensor may be generated on accuracy information associated with the sensor, how recently the sensor was calibrated, and so forth.

Method 600 also includes storing non-anomalous data in a validated data store at 630. Method 600 also includes storing anomalous data found to be a result of an event of significance at 640. The anomalous data found to be resulting from significant events may also be stored to the validated data store. To determine whether anomalous data is a result of an event of significance, the anomalous data may be compared to a set of patterns describing anomalous sensor activity.

Method 600 also includes updating the set of patterns at 660. As described above, updating the set of patterns ay include modifying a weight associated with a pattern that reflects a confidence level of whether data matching the pattern is a result of a sensor malfunction, an event of significance, and so forth. Method 600 also includes distributing data from the validated data store at 680. The data may be distributed to consumers of the data from the validated data store, who may, for example, pay for access to the validated data.

Figure 7:
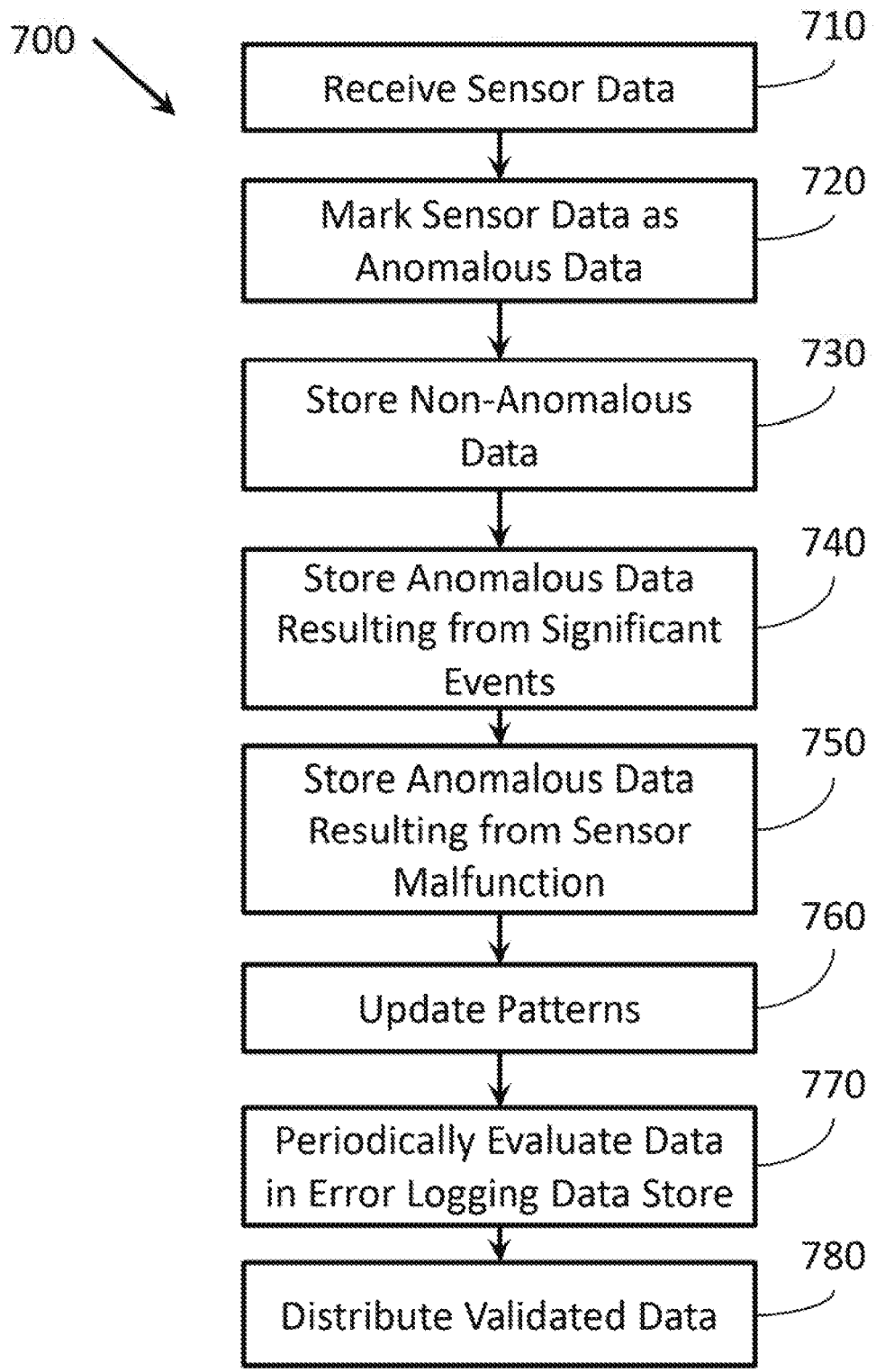
FIG. 7 illustrates another flowchart of example operations associated with data validation.

FIG. 7 illustrates a method 700 associated with data validation. Method 700 includes several actions similar to those described above with reference to method 600 (FIG. 6). For example, method 700 includes, receiving sensor data at 710, marking sensor data as anomalous data at 720, storing non-anomalous data at 730, storing anomalous data resulting from events of significance at 740, updating patterns at 760, and distributing validated data at 780.

Method 700 also includes storing anomalous data found to be a result of a sensor malfunction at 750. Anomalous data resulting from sensor malfunctions may be stored in an error logging data store. Whether data results from a sensor function may also be determined based on the set of patterns.

Method 700 also includes, at 770, periodically evaluating whether data in the error logging data store is a result of an event of significance based on updated patterns.

Figure 8:
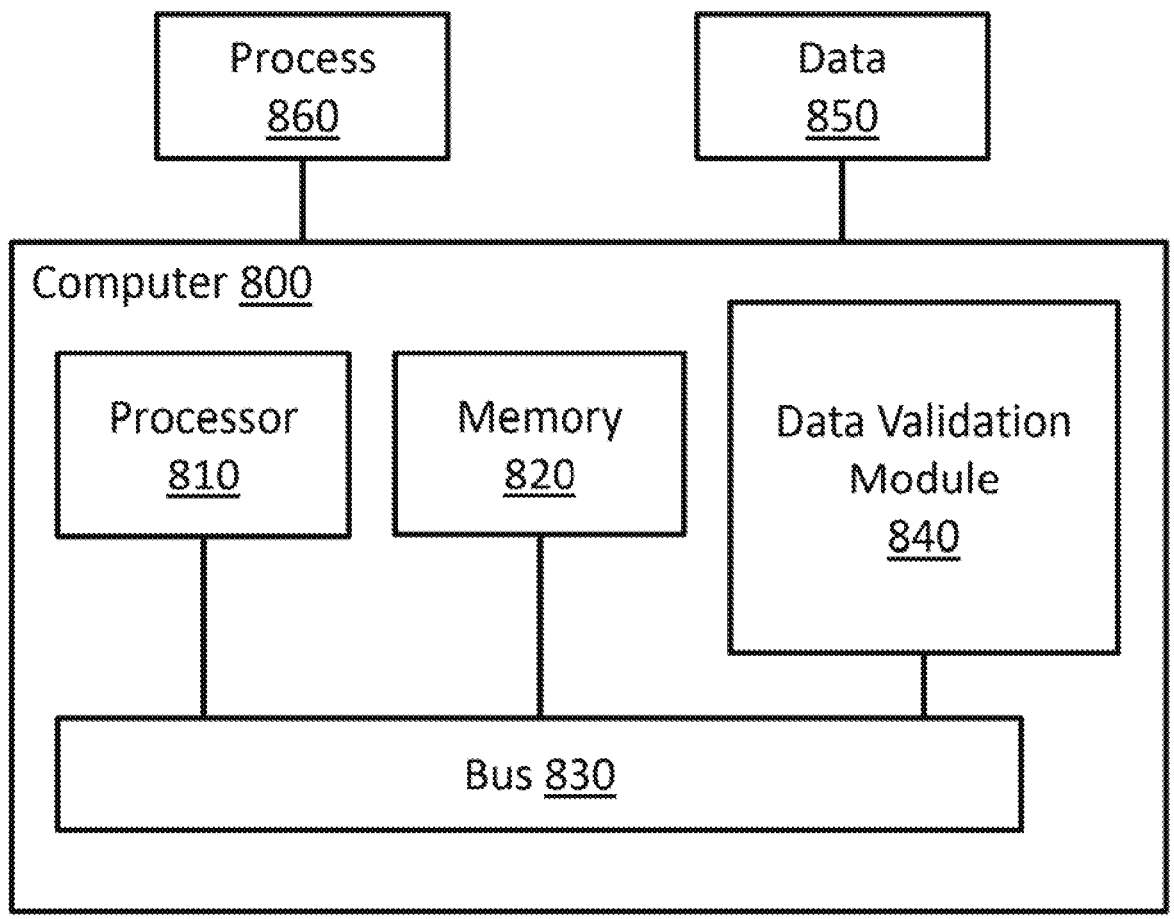
FIG. 8 illustrates an example computing device in which example systems, and methods, and equivalents, may operate.

FIG. 8 illustrates an example computing device in which example systems and methods, and equivalents, may operate. The example computing device may be a computer 800 that includes a processor 810 and a memory 820 connected by a bus 830. The computer 800 includes a data validation module 840. Data validation module 840 may perform, alone or in combination, various functions described above with reference to the example systems, methods, apparatuses, and so forth. In different examples, data validation module 840 may be implemented as a non-transitory computer-readable medium storing computer-executable instructions, in hardware, software, firmware, an application specific integrated circuit, and/or combinations thereof.

The instructions may also be presented to computer 800 as data 850 and/or process 860 that are temporarily stored in memory 820 and then executed by processor 810. The processor 810 may be a variety of various processors including dual microprocessor and other multi-processor architectures. Memory 820 may include non-volatile memory (e.g., read only memory) and/or volatile memory (e.g., random access memory). Memory 820 may also be, for example, a magnetic disk drive, a solid state disk drive, a floppy disk drive, a tape drive, a flash memory card, an optical disk, and so on. Thus, memory 820 may store process 860 and/or data 850. Computer 800 may also be associated with other devices including other computers, peripherals, and so forth in numerous configurations (not shown).

It is appreciated that the previous description of the disclosed examples is provided to enable a person skilled in the art to make or use the present disclosure Various modifications to these examples may be apparent, and the generic principles defined herein may be applied to other examples without departing from the spirit or scope of the disclosure. Thus, the present disclosure is not intended to be limited to the examples shown herein but is to be accorded the widest scope consistent with the principles and features disclosed herein.

What is claimed is:

1. A system, comprising:
 a sensor attribute data store to store information describing attributes of a set of distributed sensors, wherein the attributes of the set of distributed sensors comprise attributes describing model information of the sensors, attributes describing expected data to be received from the sensors, and attributes describing expected anomalous behaviors of the sensors;

a pattern data store to store information describing patterns indicating anomalous sensor activity;

a data aggregation module to flag data received from a tested sensor as anomalous data when the anomalous data exceeds a variance level described by an attribute of the tested sensor;

a data validation module to validate the anomalous data by comparing the anomalous data to the patterns indicating anomalous sensor activity;

a learning module to update a pattern indicating anomalous sensor activity based on a result received from the validation logic after the validation logic validates data received from the tested sensor.

2. The system of claim 1, further comprising:

an error logging data store to store anomalous data that fails validation; and an error checking module to re-validate data in the error logging data store when the learning module updates a pattern indicating anomalous sensor activity.

3. The system of claim 1, further comprising:

a validated data store to store data received from the tested sensor that falls within the variance level and to store anomalous data received from the tested sensor that passes validation by the data validation module; and a distribution module to facilitate distribution of data in the validated data store.

4. The system of claim 1, where the patterns indicating anomalous sensor activity include:

specific scenarios that describe a sensor behavior to be treated as anomalous; and learned patterns of sensor behaviors to be treated as anomalous.

5. The system of claim 1, where the learning logic updates the pattern by modifying a weight associated with the pattern, the weight indicating a likelihood that anomalous data satisfying the pattern is a result of a sensor malfunction.

6. A method, comprising:

receiving sensor data from a set of distributed sensors, the set of distributed sensors associated with attributes describing model information of the sensors, attributes describing expected data to be received from the sensors, and attributes describing expected anomalous behaviors of the sensors;

marking sensor data as anomalous data when the anomalous data exceeds a variance level associated with a sensor from which the anomalous data was received;

validating, based on a set of patterns describing anomalous sensor activity, whether the anomalous data is a result of one of a sensor malfunction and an event of significance;

updating the set of patterns based on whether the anomalous data is validated as the sensor malfunction and the event of significance; and distributing a plurality of verified data comprising sensor data within the variance level and validated anomalous data.

7. The method of claim 6, further comprising:

logging anomalous data indicated as a sensor malfunction; and revalidating logged anomalous data after an update to the set of patterns.

8. The method of claim 6, where distributing the plurality of verified data comprises one or more of, providing raw data associated with a portion of the plurality of verified data, providing query access to the plurality of verified data, and providing a result of a query of the plurality of verified data.

9. The method of claim 6, where variance levels for sensors are generated based on device specifications describing known sensor malfunctions for respective sensors.

10. The method of claim 6, where the set of patterns includes weights that indicate a likelihood that anomalous data is a result of a sensor malfunction and where updating the set of patterns includes modifying the weights.

11. A non-transitory computer-readable medium storing computer-executable instructions that when executed by a computer cause the computer to:

receive sensor data from a set of distributed sensors, the set of distributed sensors associated with attributes describing model information of the sensors, attributes describing expected data to be received from the sensors, and attributes describing expected anomalous behaviors of the sensors;

mark sensor data as anomalous data when the anomalous data exceeds a variance level associated with a sensor from which the anomalous data was received;

store non-anomalous data in a validated data store;

store in the validated data store, anomalous data found, based on a set of patterns describing anomalous sensor activity, to be a result of an event of significance;

update the set of patterns; and distribute data from the validated data store.

12. The non-transitory computer-readable medium of claim 11, where the instructions further cause the computer to:

store in an error logging data store, anomalous data found, based on the set of patterns, to be a result of a sensor malfunction; and periodically evaluate whether data in the error logging data store is a result of an event of significance based on updated patterns.

13. The non-transitory computer-readable medium of claim 11, where the variance level for a sensor is based on accuracy information associated with the sensor and how recently the sensor was calibrated.

* * * * *